United States Patent Office 2,941,997
Patented June 21, 1960

2,941,997

16α,17α-ACETAL AND KETAL DERIVATIVES OF 16α,17α-DIHYDROXYPROGESTERONE

Josef Fried, Princeton, N.J., assignor to Olin Mathieson Chemical Corporation, New York, N.Y., a corporation of Virginia No Drawing. Filed Nov. 18, 1958, Ser. No. 774,607

7 Claims. (Cl. 260—239.55)

This invention relates to, and has for its object the provisions of, a method of preparing physiologically active steroids, and to the physiologically active steroids produced thereby.

The steroids of this invention include the 16α,17α-acetal and ketal derivatives of 16α,17α-dihydroxy steroids and ketones or aldehydes, and more particularly steroids of the general formula

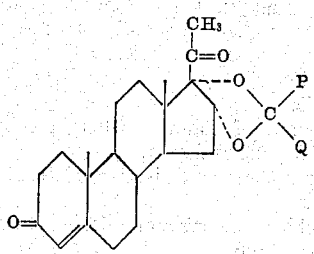

wherein P is hydrogen, a lower alkyl radical, a monocyclic aromatic radical, a monocyclic aromatic lower alkyl radical, a monocyclic heterocyclic radical, or a monocyclic heterocyclic lower alkyl radical; Q is a monocyclic aromatic radical, a monocyclic aromatic lower alkyl radical, a monocyclic heterocyclic radical, or a monocyclic heterocyclic lower alkyl radical; or together P and Q is a heteroyclic radical.

The compounds of this invention are prepared by interacting 16α,17α-dihydroxyprogesterone with an aldehyde or ketone of the formula:

wherein P and Q are as above-defined, and recovering the resultant acetal or ketal derivative. The reaction is preferably carried out by treating a suspension or solution of the steroid in the aldehyde or ketone (or an organic solvent if the aldehyde or ketone is a solid) with an acid catalyst (e.g. perchloric acid, p-toluenesulfonic acid, hydrochloric acid, etc.) neutralizing the acid and recovering the acetal or ketal derivative formed.

Suitable aldehyde and ketone reactants include monocyclic aromatic aldehydes such as benzaldehyde, halobenzaldehydes (e.g. p-chlorobenzaldehyde), lower alkoxy benzaldehydes (e.g. o-anisaldehyde), di(lower alkoxy)-benzaldehydes (e.g. veratraldehyde), hydroxybenzaldehydes (e.g. salicylaldehyde), dihydroxy-benzaldehydes (e.g. resorcylaldehyde), lower alkyl benzaldehydes (e.g. m-tolualdehyde and p-ethylbenzaldehyde), di(lower alkyl)benzaldehydes (e.g. o-p-dimethylbenzaldehyde), nitrobenzaldehydes, acylamidobenzaldehydes (e.g. N-acetylanthranilaldehyde), and cyanobenzaldehydes; monocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldeydes, such as alloxane, picolinaldehydes, furfural, thiophene carbonals, and halo, lower alkoxy, hydroxy, lower alkyl, nitro, and cyano derivatives thereof; and monocyclic heterocyclic lower alkanals; monocylic aromatic ketones, such as acetophenone, propiophenone, butyrophenone, valerophenone, isocaprophenone, halophenyl lower alkyl ketones (e.g. p-chloroacetophenone), (lower alkoxy)phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. nitroacetophenone), acylamidophenyl lower alkyl ketones (e.g. acetylanilines), and cyanophenyl lower alkyl ketones; benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones, such as 2-acetyl-furan, 2-benzoyl furan, and 2-acetylthiophene; and monocyclic heterocyclic lower alkanones.

All of the compounds of this invention are physiologically-active substances which possess progestational activity when administered both in the form of tablets and as a solution or suspension and hence can be used in lieu of known progestational agents such as progesterone in the treatment of habitual abortion for which purpose they can be administered in the same manner as progesterone, for example, the dosage being adjusted for the relative potency of the particular steroid. This group of steroids, however, is most effective when used perorally in the form of tablets.

The following examples are illustrative of the invention (all temperatures being in centigrade):

EXAMPLE 1

*Acetophenone derivative of 16α,17α-dihydroxyprogesterone*

To a suspension of 500 mg. of 16α,17α-dihydroxyprogesterone in 25 ml. of freshly redistilled acetophenone is added .125 ml. of 72% perchloric acid and the mixture is agitated at room temperature for one hour. The clear solution is washed with dilute sodium bicarbonate to remove excess acid and the acetophenone layer, after addition of chloroform is separated from the aqueous phase. The organic layer is dried over sodium sulfate and after removal of the chloroform and acetophenone in high vacuum the residue is crystallized from 95% alcohol. The pure acetophenone derivative has the following properties: M.P. about 142–144°, $[\alpha]_D^{23}$ +43° (c, .50 in chloroform), $\lambda_{max}^{Nujol}$ 5.86, 5.97, 6.18, 13.18, 14.36 m$\mu$

*Analysis.*—Calc'd for $C_{29}H_{36}O_4$ (448.58): C, 77.64; H, 8.09. Found: C, 77.65; H, 7.84.

EXAMPLE 2

*p-Chloroacetophenone derivative of 16α,17α-dihydroxyprogesterone*

To a suspension of 500 mg. of 16α,17α-dihydroxyprogesterone in 15 ml. of p-chloroacetophenone is added .075 ml. of 70% perchloric acid. The mixture is allowed to react at room temperature for one hour and forty minutes with stirring. It is then neutralized with dilute sodium bicarbonate solution taken up in water and chloroform, and the organic layer separated off. After drying over sodium sulfate the chloroform and p-chloroacetophenone is removed in high vacuum. The resulting residue is dissolved in hexane and chromatographed on 20 grams of acid-washed alumina. Elution with hexane removes residual p-chloroacetophenone, while subsequent elution with benzene (1,000 ml.) produces the pure p-chloroacetophenone derivative, which after recrystallization from acetone-hexane has the following properties: M.P. about 161–162°; $[\alpha]_D^{23}$ +26° (c, 1.12 in chloroform);

$\lambda_{alc}^{max}$ 221 m$\mu$ ($\epsilon$=19,000) 240 m$\mu$ ($\epsilon$=16,000); $\lambda_{max}^{Nujol}$ 5.84, 6.01, 6.19, 6.70

*Analysis.*—Calc'd for $C_{29}H_{35}O_4Cl$ (483.02): C, 72.09; H, 7.51; Cl, 7.33. Found: C, 71.97; H, 7.58; Cl, 7.47.

EXAMPLE 3

*p-Nitroacetophenone derivative of 16α,17α-dihydroxyprogesterone*

To a suspension of 200 mg. of 16α,17α-dihydroxyprogesterone in a mixture of 7 ml. of dioxane and 4 grams of p-nitroacetophenone is added 0.05 ml. of 72% perchloric acid and the mixture stirred at room temperature for 3½ hours. The mixture is then neutralized with dilute sodium bicarbonate solution and the dioxane and excess p-nitroacetophenone removed by vacuum steam distillation. The residual aqueous suspension is extracted with chloroform, the chloroform layer washed with water, dried over sodium sulfate and the solvent removed in vacuo. The remaining derivative is purified by recrystallization from acetone-hexane.

EXAMPLE 4

*Benzaldehyde derivative of 16α,17α-dihydroxyprogesterone*

To a suspension of 100 mg. of 16α,17α-dihydroxyprogesterone in 15 ml. of benzaldehyde is added 0.05 ml. of 72% perchloric acid. The mixture is treated as in Example 1 and results in the formation of the benzaldehyde derivative of 16α,17α-dihydroxyprogesterone.

EXAMPLE 5

*Furfural derivative of 16α,17α-dihydroxyprogesterone*

Treatment of 16α,17α-dihydroxyprogesterone with furfural in the presence of perchloric acid according to the procedure of Example 1 results in the formation of the furfural derivative of 16,17α-dihydroxyprogesterone.

EXAMPLE 6

*Benzophenone derivative of 16α,17α-dihydroxyprogesterone*

Treatment of the 16α,17α-dihydroxyprogesterone with benzophenone as described in Example 1 furnishes the benzophenone derivative of 16α,17α-dihydroxyprogesterone.

EXAMPLE 7

*2-acetylfuran derivative of 16α,17α-dihydroxyprogesterone*

Treatment of 16α,17α-dihydroxyprogesterone with 2-acetylfuran in the presence of perchloric acid as described in Example 1 yields the 2-acetylfuran derivative.

The invention may be variously otherwise embodied within the scope of the appended claims.

What is claimed is:

1. A steroid of the general formula

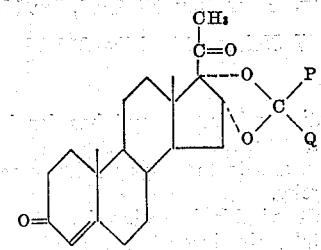

wherein P is selected from the group consisting of hydrogen, lower alkyl, monocylic aromatic and monocyclic aromatic lower alkyl; Q is selected from the group consisting of monocyclic aromatic, monocyclic aromatic lower alkyl, monocyclic heterocylic, and monocyclic heterocyclic lower alkyl radical; and together P and Q is heterocyclic.

2. The steroid of claim 1, wherein P is lower alkyl and Q is monocyclic aromatic.

3. The acetophenone derivative of 16α,17α-dihydroxyprogesterone.

4. The p-chloroacetophenone derivative of 16α,17α-dihydroxyprogesterone.

5. The p-nitroacetophenone derivative of 16α,17α-dihydroxyprogesterone.

6. The benzophenone derivative of 16α,17α-dihydroxyprogesterone.

7. The 2-acetylfuran derivative of 16α,17α-dihydroxyprogesterone.

References Cited in the file of this patent

UNITED STATES PATENTS

| | | |
|---|---|---|
| 2,584,271 | Huffman | Feb. 5, 1952 |
| 2,736,732 | Knowles | Feb. 28, 1956 |

OTHER REFERENCES

Cooley et al.: J. Chem. Soc. (December 1955), pages 4373–4377.

Fried et al.: J. Am. Chem. Soc., vol. 80 (May 5, 1958), pages 2338 and 2339.